United States Patent [19]
Anderson et al.

[11] Patent Number: 6,015,195
[45] Date of Patent: Jan. 18, 2000

[54] ENHANCED COVER ARRANGEMENT FOR A COMPUTER

[75] Inventors: Neil A. Anderson, Rochester; Mark L. Kyllo, Kasson; Dano B. Lange, Rochester, all of Minn.

[73] Assignee: International Business Machines Corporation, Armonk, N.Y.

[21] Appl. No.: 08/949,141

[22] Filed: Oct. 10, 1997

[51] Int. Cl.[7] .................................................. A47B 81/00
[52] U.S. Cl. ...................... 312/223.2; 361/683; 312/222; 312/216; 312/263
[58] Field of Search ............................ 312/223.1, 223.2, 312/223.3, 265.6, 216, 219, 292.2, 292.3, 222; 361/683, 695, 724

[56] References Cited

U.S. PATENT DOCUMENTS

| | | | |
|---|---|---|---|
| 4,616,890 | 10/1986 | Romick | 312/216 X |
| 4,705,326 | 11/1987 | Craig | 312/216 X |
| 5,360,263 | 11/1994 | Nakano et al. | 312/263 X |
| 5,491,611 | 2/1996 | Stewart et al. | 312/223.2 X |
| 5,587,877 | 12/1996 | Ryan et al. | 312/223.2 X |
| 5,593,219 | 1/1997 | Ho | 361/683 X |
| 5,641,215 | 6/1997 | Pochet | 312/222 X |
| 5,768,097 | 6/1998 | Jelinger | 312/223.2 X |

*Primary Examiner*—Peter M. Cuomo
*Assistant Examiner*—Stephen Vu
*Attorney, Agent, or Firm*—Robert H. Berdo, Jr.; Matthew J. Bussan

[57] ABSTRACT

A cover includes a side panel having an opening therethrough. A sliding member is connected to the side panel, and is slidable to an opened position in which the opening is at least partially uncovered, and is slidable to a closed position in which the opening is closed. A mounting is tab connected to the side panel and is arranged to be accessible through the opening only when the sliding member is in the opened position. A front panel is also provided, which can be fastened and locked to the side panel using no visible fasteners.

20 Claims, 6 Drawing Sheets

ENHANCED COVER ARRANGEMENT FOR A COMPUTER

CROSS REFERENCE TO RELATED PATENT APPLICATIONS

The subject matter of this application is related to co-pending application Ser. No. 08/948,607, filed Oct. 10, 1997, entitled "MODULAR CABINET" by Neil A Anderson, et al., attorney docket number RO997-137-IBM-104.

BACKGROUND OF THE INVENTION

1. Field of the Invention

The invention relates to an enhanced cover arrangement for a computer, for example, a deskside personal computer, and in particular, to an enhanced cover arrangement encasing and fastened to a computer frame with no visible means of attachment.

2. Background Information

Frames or other enclosures are often used to house the various components of a computer. For example, circuit boards of the computer may be located within a metal frame to provide a shield from external electrical influences, to protect the circuit boards from being damaged by forces during movement, and to provide support for the circuit boards so that the circuit boards are properly positioned relative to each other for cooling, electrical connection and ventilation purposes.

However, such frames are generally not very aesthetically pleasing. For example, the frame may be provided with various air passages to allow for a cooling air to pass therethrough to cool the electrical components located within the frame. These air passages are generally located without regard to the aesthetic appearance of the frame.

Further, the fame may be provided with one or more sub-enclosures, each of which houses specific components of the computer. These components are generally interconnected, or connected to other components of the computer, using ribbon cables that extend externally from one sub-enclosure to another sub-enclosure. This likewise may not be aesthetically pleasing.

In order to conceal the various inner workings of the computer, the frame may be provided with a cover, which when installed, gives the computer a finished look. The cover may be given a decorative appearance, using various design configurations, as are known in the art. As such, the computer (with cover installed) can be used in home or office settings, with the cover allowing the computer to blend in with the decor of the home or office.

Covers also provide a barrier between the internal electrical components of the computer and the user. The cover prevents the user from inadvertently coming in contact with a high-temperature or high-powered component through openings in the frame, thus protecting the user from accidental injury.

Further, covers help protect the components located within the frame from environmental contamination, such as from dust or a spilled liquid. For example, should a user inadvertently spill a glass of water on the computer, the cover will provide a barrier that will help prevent the water from coming in contact with the internal components.

Additionally, covers provide sound barriers that help to muffle any noise generated by the components within the computer. For example, cooling blowers or fans are often used within the computer frame to cool the high-powered components located within the computer. These cooling blowers tend to generate a substantial amount of noise, which may be annoying to the user of the computer or to others working in the vicinity of the computer. The cover helps to contain this noise.

Typically, the frame has a rectangular box shape (i.e., parallelepiped), with the cover usually covering a front of the fame, two opposing sides of the fame, and a top of the fame. This amount of coverage has generally been deemed sufficient to give the computer the desired finished look, while providing an adequate barrier (both acoustical and physical) between the computer components and the user.

The cover is typically comprised of a plurality of panels arranged at right angles to one another. The panels may be permanently connected to one another to form a unitary structure that slides over and is fastened to the frame. Alternatively, the cover may be comprised of one or more separate panels, each of which is separately fastened to the frame. Covers that are comprised of separate panels are often used for covering large frames, since a large, unitary cover is more difficult to manufacture, store, and transport.

Typically, the cover is fastened to the underlying frame using a plurality of fasteners. This provides a secure connection between the cover and the frame and helps to prevent the cover from rattling against the frame when subject to vibrations. For example, spring clips may be used to connect the panels of the cover to the frame. However, spring clips may not provide a sufficiently secure connection between the cover panels and the frame and may easily loosen or break. Further, spring clips are generally pressed into corresponding holes located on the frame. In order to engage the spring clips with the holes, a user may tend to pound on the cover in a jarring manner. If this occurs while the computer is operating, the hard drive of the computer may skip or be damaged, or other components located within the frame may be knocked loose or damaged. Alternatively, screw fasteners may be used to fix the cover to the frame. Screw fasteners provide for a more secure connection than spring clips. However, installing and removing screw fasteners is more labor-intensive than using spring clips. Therefore, a need exists for a cover which can be installed or removed from a frame, without jarring of the internal components, even while the computer is operating.

The number of fasteners needed generally depends on the number of panels the cover has, and the size of the panels. When attaching a plurality of large cover panels to the frame, many fasteners are needed to hold each panel securely against the frame. However, typically the fasteners can be seen by the user after they are installed, which detracts from the aesthetic appearance of the computer. Further, when screw fasteners are used, the installation and removal of such a large number of screw fasteners is labor-intensive. Therefore, a need exists for a cover that can be securely and easily fixed to a frame using a minimal number of fasteners, each of which is hidden from view.

For security reasons, it may be also be desirable to protect the components located within the frame of the computer from potential theft. For example, memory chips located upon a memory riser card within the computer are usually easily removable. Since memory chips are relatively expensive, and may be usable in other computers, these memory chips are susceptible to theft. Further, hard drives within the computer often contain sensitive, confidential information. By removing the hard drive from the computer, a thief can access the information on the hard drive at his convenience. Therefore, a need exists for a cover that can be locked to a frame, so that the components within the frame cannot be accessed without first unlocking the cover.

It may also be desirable to prevent use of the computer from unauthorized individuals. For example, as mentioned above, the computer hard drive may contain sensitive, confidential information. If an unauthorized person wanted to access this information, rather than removing the hard drive, the person would only need to turn the computer on and access the information in the normal manner. Therefore, a need exists for a cover that can be locked to prevent use of the computer by unauthorized users.

SUMMARY OF THE INVENTION

It is, therefore, a principal object of this invention to provide an enhanced cover arrangement for a computer.

It is another object of the invention to provide an enhanced cover arrangement that solves the above mentioned problems.

These and other objects of the present invention are accomplished by the cover arrangement disclosed herein.

According to one aspect of the invention, a cover having at least one panel is provided. The panel is generally a planar structure, but is not limited to such. For example, the panel may also be provided with curves therein, or be shaped in a curvilinear manner. The panel is arranged over a frame, and includes a sliding member that slides to an opened position to allow access to the frame. Once the sliding member is in the opened position, a tab connected to the panel is accessible. The tab is arranged to be placed adjacent to the frame and has a hole therethrough for the insertion of a fastener. The fastener is passed through the hole in the tab and screwed into the frame, thus securing the frame to the cover panel. Thereafter, the sliding member is slid into a closed position, thus covering the fastener. This arrangement advantageously hides the fasteners from view, giving the cover an aesthetically pleasing appearance.

According to a further aspect of the invention, the sliding member is in the form of a sliding louver, which is arranged to align with a fixed louver formed in the panel. Thus, when moved into the closed position, the sliding member advantageously blends in with the louver of the panel, so that the sliding member is not readily identifiable as a separate component.

According to yet a further aspect of the invention, the sliding member is positioned in guides located on the panel, and is urged into a normally closed position using a spring. The sliding member includes a catch member that removably engages with a retention piece located on the panel, when the sliding member is in the opened position. The catch member and retention piece advantageously engage to hold the sliding member in the opened position, thus allowing for easy access to the fastener.

According to yet another aspect of the invention, the at least one panel may include at least two panels connectable together along their respective edges, so as to form a right angle. A first one of the panels includes the sliding member, and a second one of the panels includes a projecting member that extends perpendicular to a surface of the second panel, and is arranged to project parallel to an inner surface of the first panel, i.e., the panel having the sliding member. The projecting member is for pushing against the catch member of the sliding member, when the edges of the two panels are positioned together to form a right angle, causing the catch member to disengage with the retention piece. The spring then urges the sliding member into the closed position. This arrangement advantageously automatically closes the sliding member.

According to another aspect of the present invention, the sliding member has a latch that is parallel to the surface of the first panel, and projects toward the second panel. The second panel includes a latch-receiving member, which projects outward from and perpendicular to the surface of the second panel. When the sliding member is moved into the closed position, a tooth on the end of the latch engages with a recess disposed within the latch-receiving member, thus securing the first panel to the second panel. This arrangement advantageously reduces the number of fasteners, and quickly and easily secures the two panels together.

According to a further aspect of the invention, the second panel includes a lock that, when engaged, causes the first and second panels to be locked together. The lock may include a bar that is caused to slide along an inner surface of the second panel and toward the first panel. The end of the bar is insertable into an opening located within the sliding member, when the sliding member is in the closed position. This advantageously prevents the sliding member from being moved to the opened position, thus preventing access to the fastener, and removal of both the first and second panels.

According to another aspect of the invention, the second panel includes a door that is slidable to cover a power switch of the computer. When the lock is engaged, the door is prevented from being slid to an opened position, thus preventing access to the computer's power switch. This advantageously prevents unauthorized users from turning the computer on or off when the cover is locked.

According to a further aspect of the invention, a method of covering a frame without using any visible fasteners is provided. The method advantageously provides for a more aesthetically pleasing appearance.

According to another aspect of the invention, a method of preventing unauthorized access to a computer is provided. The method advantageously provides for a computer system that is less susceptible to theft.

According to still a further aspect of the invention, a method of connecting two panels together without using any visible fasteners is provided. The method advantageously provides for a more aesthetically pleasing appearance, and requires fewer fasteners that must be installed by the user, so that the panels can be installed more quickly

DETAILED DESCRIPTION OF THE PREFERRED EMBODIMENTS

The invention will now be described in more detail by way of example with reference to the embodiments shown in the accompanying figures. The following described embodiments are only presented by way of example and should not be construed as limiting the inventive concept to any particular physical configuration.

Figure 1:
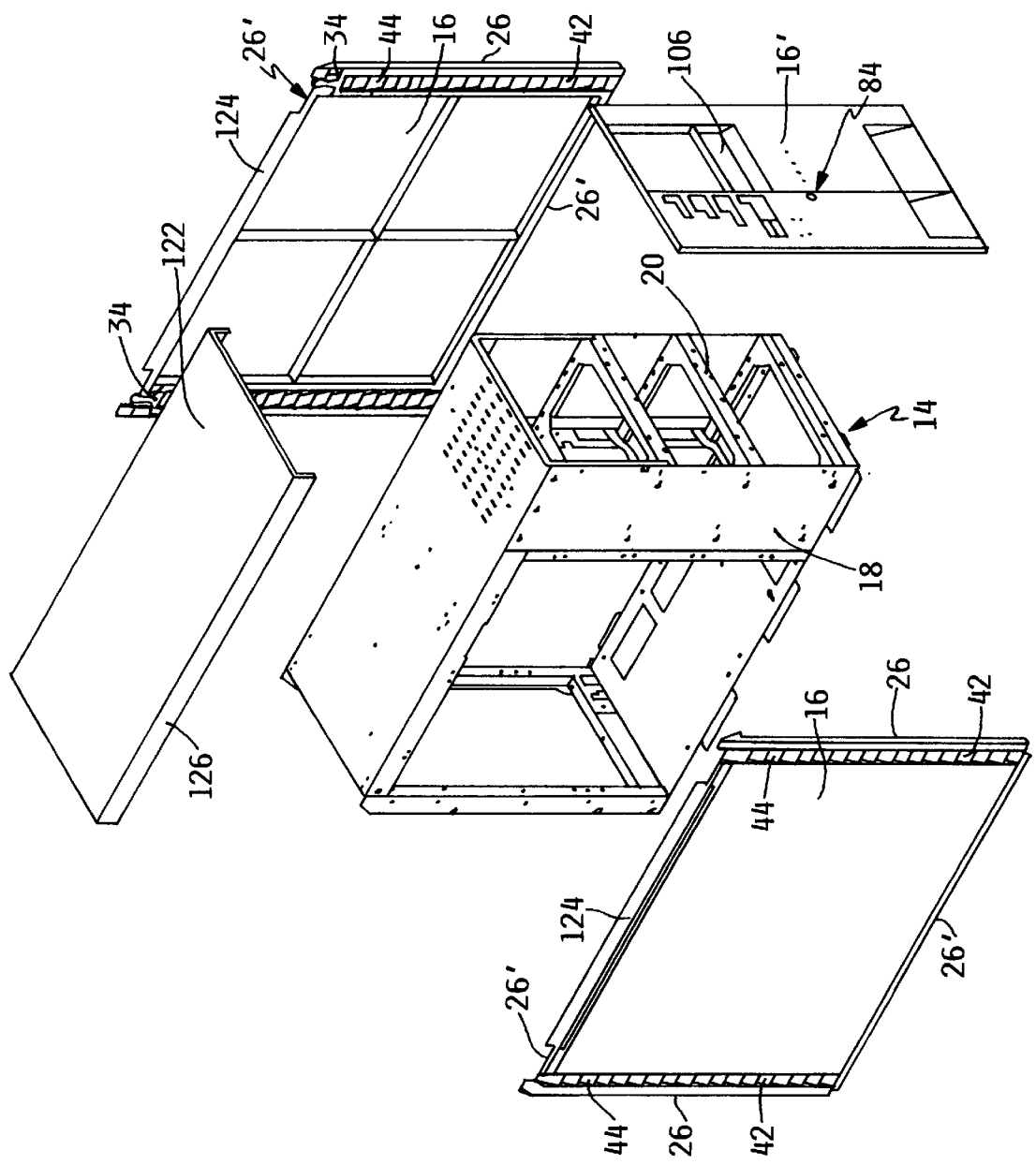
FIG. 1 is a perspective, exploded illustration of a cover according to an exemplary embodiment of the invention, arranged about a frame.

FIG 1 illustrates an exemplary cover according to the invention. The cover may be used to cover the frame 14 of a computer, such as is described in related co-pending application attorney docket RO997-137-IBM-104, referenced above, but is not limited to such an application. For example, the cover according to the invention may be used to cover any frame, enclosure, or component, as will be appreciated by one skilled in the art. Further, although in this exemplary embodiment the frame 14 is illustrated as being generally a parallelepiped, the cover according to the invention is not limited to covering such shapes. It is contemplated that the cover according to the present invention can also be used to cover other shapes, without departing from the spirit or scope of the invention.

The cover includes at least one panel 16, which when in use, is arranged over the frame 14. For example, the panel 16 as illustrated is placed over a side 18 of the frame 14 to cover the side 18 of the frame. Other placements of such a panel are also possible. For example, such a panel could be used to cover a front of a frame.

The panel 16 is typically planar and rectangular in shape, although other configurations, such as including non-planar features, may be possible within the spirit of the invention. Generally, the panel 16 has a shape that roughly corresponds to the profile of the underlying frame 14. When installed, the frame 14 is attached to and covered by the panel 16. In this exemplary embodiment, the panel 16 is planar and measures about 24 inches in height by about 31 inches in width.

Figure 2:
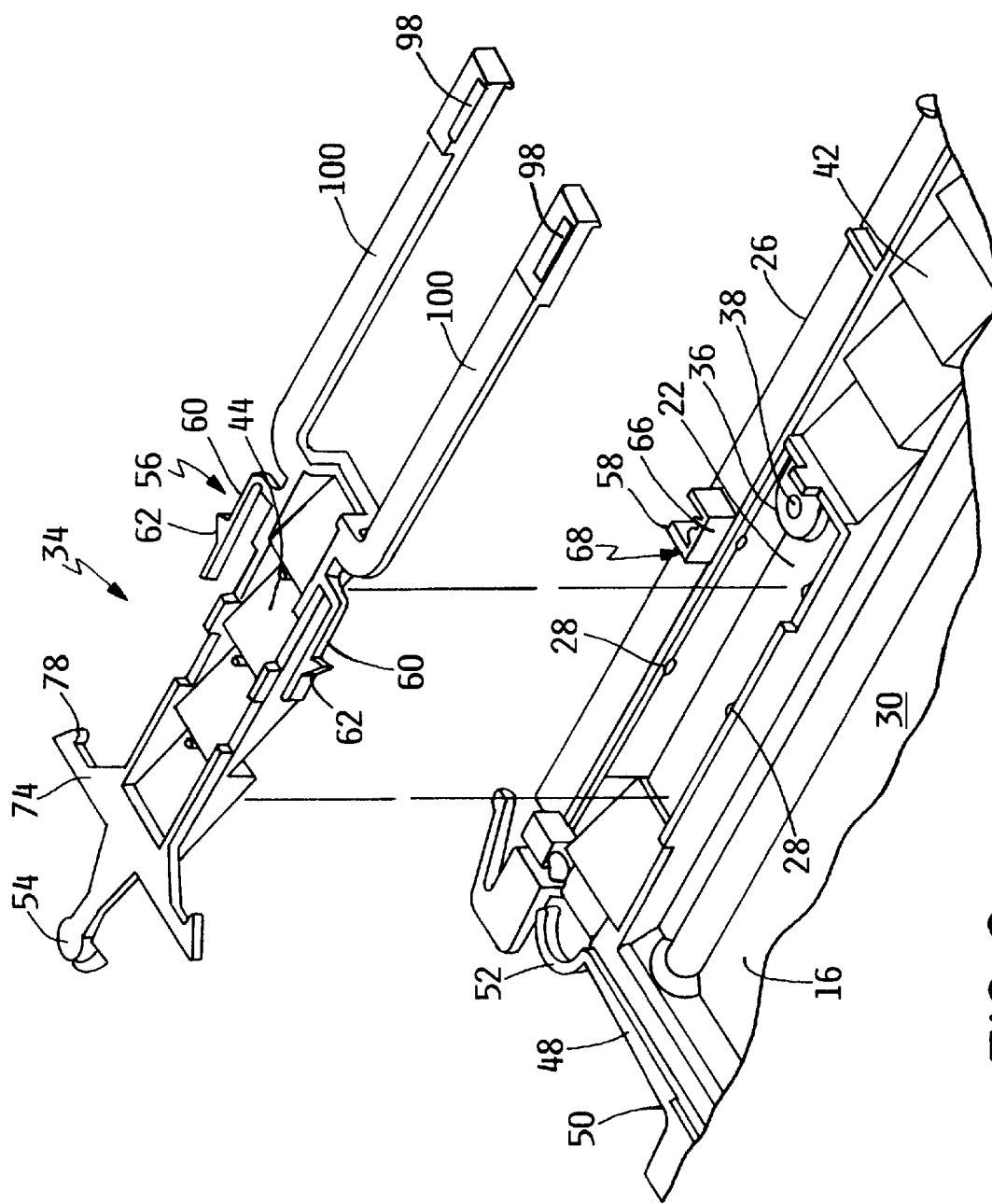
FIG. 2 is a partial, perspective, exploded view of a panel of the cover shown in FIG. 1, and a sliding member, according to an exemplary embodiment of the invention.

Referring also to the detail in FIG. 2, the panel 16 includes at least one opening 22 located, for example, in an upper portion of the panel 16 and adjacent to one of the edges 26 of the panel 16. In this embodiment, the opening 22 is generally rectangular in shape, and extends in a direction of the upright edge 26 of panel 16 (i.e., the shorter of the edges). Other locations and configurations of the opening 22 may also be possible within the spirit of the invention.

Figure 3:
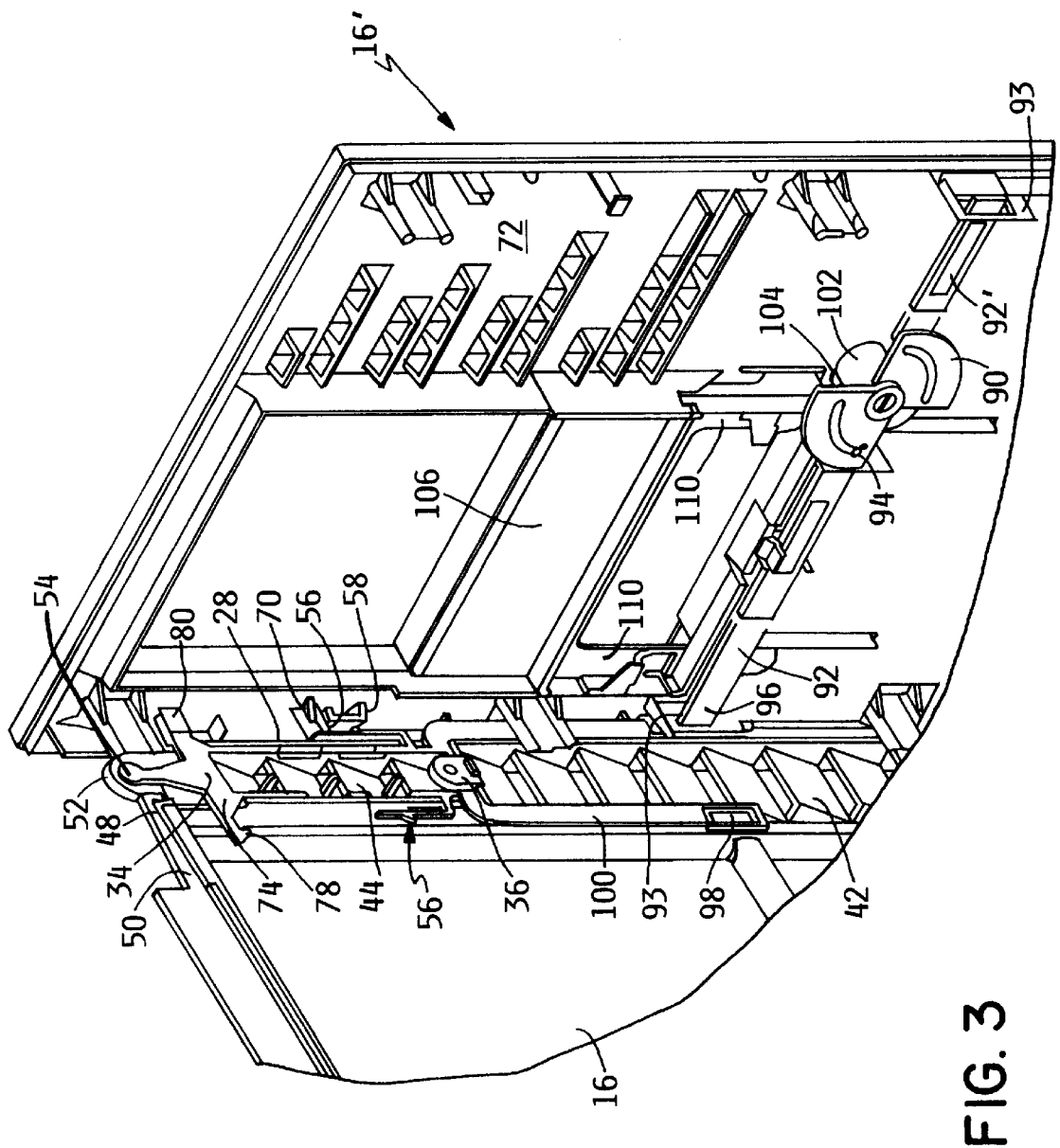
FIG. 3 is a partial perspective view of two of the panels of the cover shown in FIG. 1 interconnected and locked together, according to an exemplary embodiment of the invention.
Figure 4:
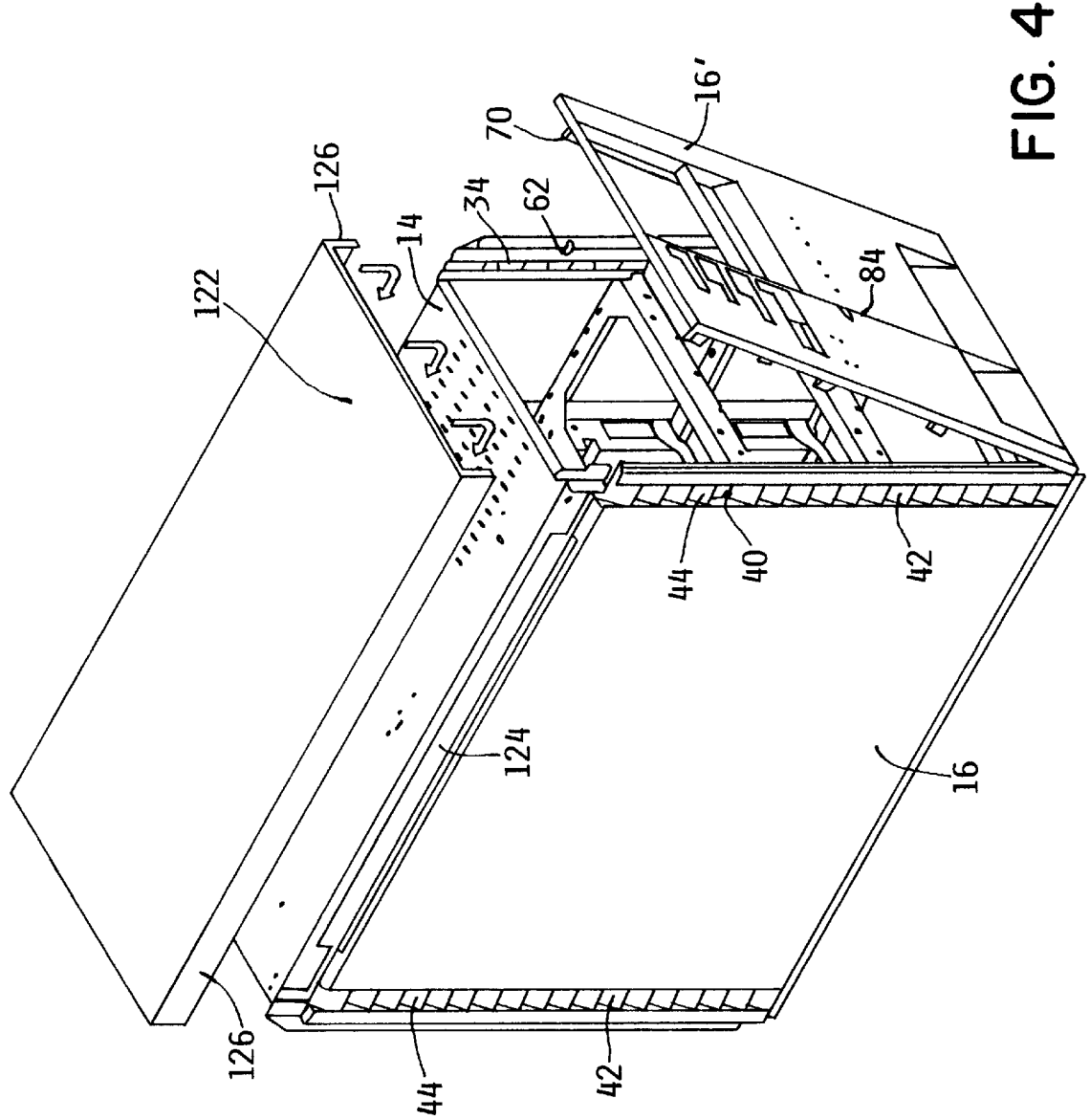
FIG. 4 is a perspective illustration of the cover shown in FIG. 1, showing the installation of the panels on the frame.

Guides 28 are located, for example, on an inner surface 30 of the panel 16, and at opposite edges of the opening 22. The guides 28 receive a sliding member 34, which can move, for example, in a vertical direction (i.e., in a direction parallel to upright edges 26), to both an opened and closed position. When the sliding member 34 is moved to the opened position, i.e., slid upward, the underlying frame 14 can be accessed through the opening 22. However, when the sliding member 34 is moved to the closed position, the opening 22 is closed off, preventing access to the frame 14 through the opening 22. The closed position of the sliding member 34 is best shown in FIG. 3, and the opened position of the sliding member 34 is best shown in FIG. 4. The sliding member 34 may also be arranged to slide in other directions, without departing from the spirit and scope of the invention.

A mounting tab 36 is affixed to an inner surface of the panel 16, and is arranged to project into the opening 22. When the panel 16 is placed against the frame 14, the mounting tab 36 is positioned adjacent to the frame 14. The mounting tab 36 has a hole 38 therethrough that receives a fastener 40 (shown only schematically in FIG. 4), for example a screw, for fastening the panel 16 to the frame 14.

When attaching the panel 16 to the frame 14, the sliding member 34 is moved to the opened position, allowing access to the mounting tab 36. The fastener 40 can then be passed through the hole 38 in the mounting tab 36, and fastened to the frame 14, thus securing the frame 14 to the panel 16. Thereafter, the sliding member 34 can be slid into a closed position, thus covering the fastener 40. This arrangement advantageously hides the fasteners 40 from view, giving the cover an aesthetically pleasing appearance.

The panel 16 may further include a vertically extending slotted member, such as louver 42, which is in alignment with the opening 22, i.e., the louver 42 extends parallel and adjacent to the upright edge 26 of the panel 16. The louver 42 allows for cooling air to enter the frame 14 through the panel 16, to help transfer any heat generated by high-powered components (not shown) located within the frame 14. As is known, a louver is an opening provided with one or more slanted fins.

Advantageously, the sliding member 34 may have a portion that is in the form of a sliding slotted member, such as sliding louver 44. Sliding louver is arranged within the opening 22 and in alignment with the louver 42 formed in the panel 16. When the sliding member 34 is in the closed position, the sliding member 34 advantageously blends in with the louver 42 of the panel 16, so that the sliding member 34 is not readily identifiable as a separate component. However, when the sliding member 34 is moved into the opened position, the bottom of the sliding louver 44 is moved upward, thus allowing for the fastener 40 and/or mounting tab 36 to be accessed (as shown in FIG. 4). Other configurations of the sliding member 34 are also possible, although it is preferable for the sliding member 34 to blend in with the configuration of the rest of the panel 16.

As best shown in FIG. 3, preferably the sliding member 34 is urged into the closed position using a spring. For example, in this exemplary embodiment the spring is a flexible, cantilever member 48 having one end 50 connected to the panel 16, and a free end 52 in contact with the sliding member 34. When the sliding member 34 is in the opened position, an upper portion 54 of the sliding member 34 presses against the free end 52 of the cantilever member 48, causing the cantilever member 48 to flex and stress. As a result, the cantilever member 48 exerts a force against the sliding member 34, causing the sliding member 34 to be urged downward, i.e., into the closed position. Of course, the present invention is not limited to the cantilever member 48. For example, other spring arrangements may also be used to urge the sliding member 34 in the desired direction.

Preferably, the sliding member 34 includes a catch member 56 which engages with a retention piece 58 located on the panel 16, when the sliding member 34 is in the opened position. For example, the catch member 56 can have a flexible arm 60 having a hook 62 on its free end. The flexible arm 60 can be formed to flex toward the retention piece 58, so that when the sliding member 34 is in the closed position, the hook 62 is pressed against the side 66 of the retention piece 58. However, when the sliding member 34 is moved to the opened position, the hook 62 is raised above the retention piece 58, allowing the flexible arm 60 to push the hook 62 into engagement with a top surface 68 of the retention piece 58. This arrangement holds the sliding member 34 in the opened position, thus allowing for easy access of the fastener 40. When the sliding member 34 is to be moved into the closed position, the hook 62 is pushed away from the retention piece 58 (i.e., against the force of the flexible arm 60). Once the hook 62 disengages with the retention piece 58, the sliding member 34 is free to move into the closed position. Other arrangements for holding the sliding member 34 in the opened position may also be possible within the spirit of the invention.

Although the panel 16 has been described with only one opening 22 and sliding member 34, the panel 16 may include two or more openings 22, each of which contains a respective sliding member 34 and the associated structure. Further, preferably the panel 16 is symmetrically arranged, with one sliding member 34 being located at the left upright edge of the panel 16, and another sliding member 34 being located at the right upright edge of the panel 16, such as shown in FIGS. 1 and 4.

Further, and as best shown in FIGS. 3 and 4, although the cover has been described with only one panel 16, typically the cover includes at least first and second panels 16, 16' connectable together along their respective edges to form, for example, a right angle. When installed, each of the panels 16, 16' covers a respective side of the frame 14.

Preferably, first panel 16 includes the sliding member 34, and second panel 16' includes a projecting member 70 attached to the inner surface 72 of the second panel 16' near an edge thereof. The projecting member 70 extends essentially perpendicular to the inner surface 72 of the second panel 16', and is arranged to project parallel to the surface of the first panel 16, i.e., the panel having the sliding member 34. As the edges of the two panels 16, 16' are positioned together, i.e., so that the panels are flush against the frame 14, the projecting member 70 pushes against the hook 62, causing the hook 62 to disengage with the retention piece 58. The cantilever member 48 then urges the sliding member 34 into the closed position. This arrangement advantageously automatically closes the sliding member 34 when the second panel 16' is installed.

Preferably, the sliding member 34 has a rigid latch arm 74 which is parallel to the surface of the first panel 16, and projects toward the second panel 16'. The free end of the latch arm 74 has a downwardly projecting tooth 78. Further, the second panel 16' includes a latch-receiving member 80, which projects out perpendicularly to the surface of the second panel 16'. The latch-receiving member 80 includes a recess or opening therethrough (not shown), for receiving the tooth 78 of the latch arm 74. When the sliding member 34 is moved into the closed position, the tooth 78 on the end of the latch arm 74 likewise moves in a downward direction, and toward the latch-receiving member 80, until the tooth 78 engages with the recess within the latch-receiving member 80. Thus, when the sliding member 34 is closed, the first panel 16 is automatically secured to the second panel 16'. This arrangement advantageously reduces the number of fasteners needed for securing the panels to the frame, and quickly and easily secures the two panels 16, 16' together.

Preferably, and as best shown in FIG. 3, the second panel 16' includes a lock arrangement which, when engaged (i.e., locked), causes the first and second panels 16, 16' to be locked together. The lock arrangement includes a lock mechanism 84 (FIGS. 1, 4 and 6), which in this exemplary embodiment, is shown as being a key-operated lock mechanism. However, other lock mechanisms are also contemplated, such as a combination-operated lock mechanism. The key-operated lock mechanism 84 may include a key that is insertable into a tumbler, such as are well known in the art, and are thus not illustrated. The tumbler is connected to a cam plate 90 (FIG. 3), which is caused to rotate when the key is turned within its tumbler.

The lock arrangement in this exemplary embodiment may include at least one bar 92, and is arranged to slide in guides 93 fixed to the inner surface 72 of second panel 16'. Bar 92 is operatively connected to the lock mechanism 84. In particular, one end 94 of the bar 92 is in sliding engagement with the cam plate 90. As the key and cam plate 90 are rotated, the cam plate 90 causes the bar 92 to slide along an inner surface of the second panel 16' and toward the first panel 16. This movement causes the other end 96 of the bar 92 to be inserted into an opening 98 located within a downwardly projecting leg 100 of the sliding member 34, when the sliding member 34 is in the closed position. This prevents the sliding member 34 from being moved to the opened position, thereby preventing access to the fastener 40. The first and second panels 16 and 16' are therefore locked in position.

Figure 5:
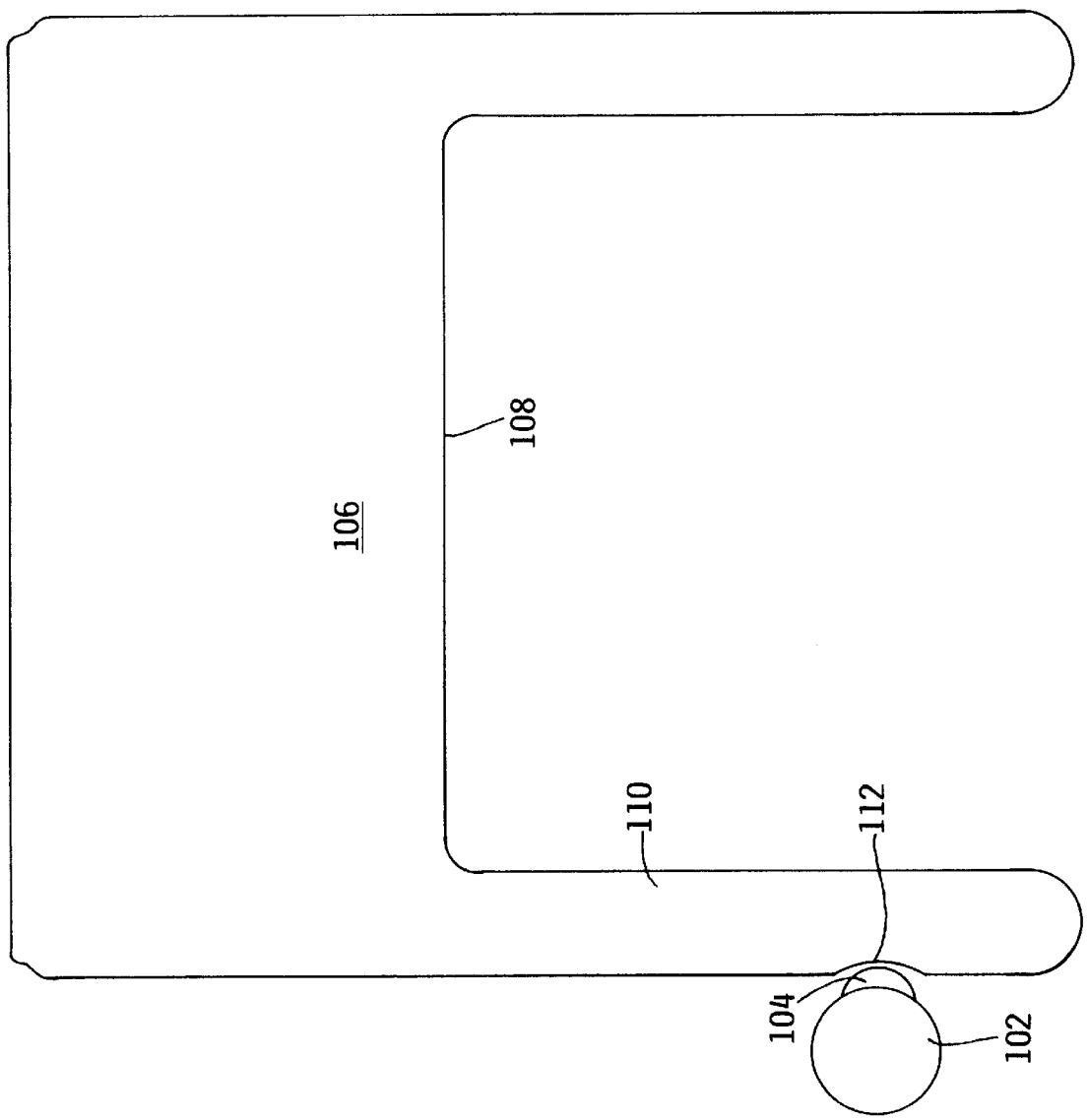
FIG. 5 is an elevational view of a door located within one of the panels shown in FIG. 4, and a portion of an associated locking arrangement, according exemplary embodiment of the invention.

According to another exemplary aspect of the invention, and referring in particular to FIGS. 3 and 5, a cylinder 102 is provided that is coaxial with the tumbler, and that is fixed to an underside of the cam plate 90. Cam plate 90 is removed in FIG. 5 for clarity. The cylinder 102 includes a radially extending raised portion 104 along a portion of the side of the cylinder 102. When the cam plate 90 is rotated, both the cylinder 102 and the raised portion 104 are likewise caused to rotate. Further, the second panel 16' includes a door 106 within a door opening, and which is slidable to cover, for example, a power switch or other components (not shown) of the computer. The base 108 of the door 106 has at least one downwardly projecting leg 110, with a recess 112 formed in an edge of the leg 110. The recess 112 has an arc profile which corresponds essentially to the profile of the raised portion 104 of the cylinder 102. When the door 106 is raised and in its closed position, i.e., covering the power switch of the computer, for example, the recess 112 is adjacent to the cylinder 102. When the key 86 is turned to a locked position, the raised portion 104 of the cylinder 102 is moved to project into the recess 112. The raised portion 104 thus prevents the door 106 from being slid to an opened position, thus preventing access to selected components of the computer, for example, the power switch. This advantageously prevents unauthorized users from turning the computer on or off when the cover is locked.

Figure 6:
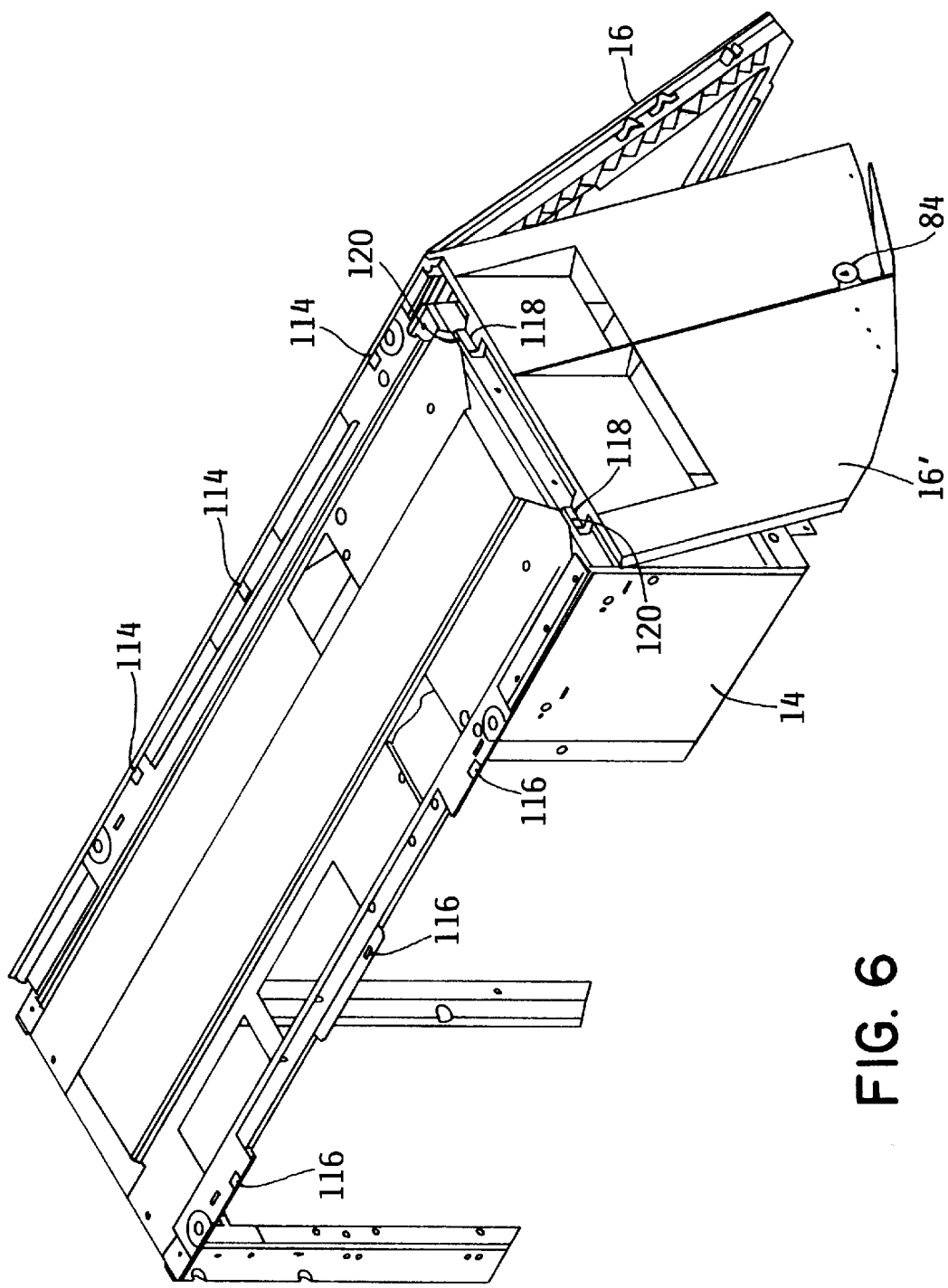
FIG. 6 is an upside-down partial perspective illustration of a portion of the cover shown in FIG. 4, illustrating the attachment of several of the panels to the frame, according to an exemplary embodiment of the invention.

Advantageously, the above components all interact together to provide a cover which is aesthetically pleasing, secure, and easy to install. Referring also to FIG. 6 (which is an upside-down view of the base of the frame and panels), when placing the cover on the computer, the first panel 16, for example, which can be a side cover of the computer, is placed adjacent to the side 18 of the frame 14. The first panel 16 may be provided with alignment tabs 114 along its base edge, which engage with recesses 116 formed in the base of the frame 14, to correctly position the panel 16 relative to the frame 14. Once in position, the sliding member 34 is moved to its opened position, and fastener 40 is inserted through the mounting tab 36 to secure the first panel 16 to the frame 14. Thereafter, the second panel 16', which may be, for example, a front cover of the computer, is placed adjacent to the front 20 of the frame 14. The second panel 16' may be provided with recesses 118 along its base edge, which engage with alignment tabs 120 formed in the base of the frame 14, to correctly position the panel 16 relative to the frame 14. As the second panel 16' is moved into position, the projecting member 70 attached to the second panel 16' pushes against the hook 62 on the sliding member 34, causing the hook 62 to disengage with the retention piece 58 on the first panel 16. The cantilever member 48 then urges the sliding member 34 into the closed position, as shown in FIG. 3. Simultaneously, the tooth 78 on the end of the latch arm 74 on the sliding member 34 moves in a downward direction, and toward the latch-receiving member 80 on the second panel 16', until the tooth 78 engages with the recess within the latch-receiving member 80. Thus, with the placement of the second panel 16' into position, the sliding member 34 is automatically moved to a closed position, and the first panel 16 is automatically secured to the second panel 16'.

Thereafter, the lock mechanism 84 can be engaged, locking the second panel 16' to the first panel 16, and locking the sliding door 106 in a closed position. This prevents the panels 16 and 16' from being removed, and prevents the power button (or other selected components of the computer, for example, a floppy drive unit) from be accessed.

Further, although only two of the panels 16, 16' of the cover have been described, typically the cover includes at least two side panels 16, and a front cover 16'. Each of the side panels 16 are similar in structure and function, and interact and connect with the front cover 16' in essentially the same manner. With such an arrangement, the lock arrangement is preferably provided with an additional bar 92' connected to cam plate 90 in the same manner as bar 92. Bar 92' interacts with the other side panel 16 in the manner previously described.

Further, for completeness, the cover may additionally include a top panel 122, which is positioned over a top of the frame 14. In order to help secure the side panels 16, each side panel 16 may be provided with a flange 124 that extends along the upper edge of the respective side panel. The top panel 122 would then likewise be provided with two parallel lips 126, arranged along opposite edges of the top panel 122, and which overlap the flanges 124 when the top panel 122 is installed.

Moreover, the cover may include a rear panel (not shown), which covers a rear of the frame 14. The rear panel could have a configuration similar to the front panel 16', and interact with the side panels 16 in a manner similar to the front panel 16'. Alternatively, the rear panel can have a different configuration than the front panel 16' and/or attach to the frame 14 in a different manner than front panel 16', for example, by using conventional clip or screw fasteners.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention is susceptible to various modifications, changes, and adaptations, and the same are intended to be comprehended within the meaning and range of equivalents of the appended claims.

What is claimed is:

1. A cover, comprising:
   a panel having an opening therethrough, said panel including a fixed louver extending in alignment with the opening;
   a sliding member connected to said panel and being slidable to an open position in which the opening is at least partially uncovered, and being slidable to a closed position in which the opening is fully closed, said sliding member including a sliding louver located within the opening and in alignment with said fixed louver, wherein said sliding louver and said fixed louver allow cooling air to pass through the panel and have the appearance of one continuous louver, when said sliding member is in the closed position; and
   a mounting tab connected to said panel and being arranged to be accessible through the opening only when said sliding member is in the open position.

2. The cover of claim 1, further comprising a spring connected to said panel, and exerting a force against said sliding member to urge said sliding member into the closed position.

3. The cover of claim 1, wherein said panel includes guides located on opposite edges of the opening, said guides receiving said sliding member, and being disposed so that said sliding member is slidable along an inner surface of said panel in said guides.

4. The cover of claim 1, wherein said panel comprises a first panel; further comprising a second panel attachable to said first panel and having a lock arrangement thereon, said lock arrangement being engageable with said sliding member when said sliding member is in the closed position to prevent the sliding member from being moved to the open position.

5. The cover of claim 4, wherein said second panel has an opening, and a door arranged in the opening, said lock arrangement being engageable with said door to prevent said door from being opened.

6. A method of covering a frame without using any fasteners visible from view outside of the cover, which comprises utilizing the cover of claim 1.

7. A cover, comprising:
   a panel having an opening therethrough;
   a sliding member connected to said panel and being slidable, relative to said panel to which said sliding member is connected to an open position in which the opening is at least partially uncovered, and being slidable, relative to said panel to which said sliding member is connected to a closed position in which the opening is fully closed, wherein said sliding member includes a catch member and is arranged to slide along an inner surface of said panel to which said sliding member is connected, and said panel includes a retention piece projecting away from the inner surface of said panel, said catch member being engageable with said retention piece when said sliding member is in the open position to retain the sliding member in the open position; and
   a mounting tab connected to said panel and being arranged to be accessible through the opening only when said sliding member is in the opened position.

8. The cover of claim 7, wherein said catch member comprises a flexible arm having one end fixed to said sliding member, and another end having a hook attached thereto, said flexible arm being flexed and stressed to urge said hook in a direction toward said retention piece, so that said hook engages with said retention piece when said sliding member is in the open position.

9. The cover of claim 8, wherein said panel comprises a first panel; further comprising a second panel attachable to said first panel and having a projecting member attached to an inner surface thereof, said second panel being locatable adjacent to said first panel to form an angle with said first panel so that said projecting member projects toward said sliding member and presses against said catch member when said sliding member is in the open position to cause said hook to disengage with said retention piece so that said sliding member can be moved toward the closed position.

10. The cover of claim 9, further comprising a spring connected to said first panel and contacting said sliding member, said spring moving said sliding member into the closed position when said projecting member presses against said catch member and disengages said hook.

11. A cover, comprising:

a first panel having an opening therethrough;

a sliding member connected to said first panel and being slidable to an open position in which the opening is at least partially uncovered, and being slidable to a closed position in which the opening is fully closed, wherein said sliding member is arranged to slide along an inner surface of said first panel and includes a rigid latch arm;

a second panel attachable to said first panel and having a latch-receiving member attached to an inner surface thereof, said second panel being locatable adjacent to said first panel to form an angle with said first panel, so that said latch-receiving member projects toward said sliding member, said latch-receiving member and said rigid latch arm engaging together when said sliding member is moved to the closed position, so as to secure said first panel to said second panel; and a mounting tab connected to said first panel and being arranged to be accessible through the opening only when said sliding member is in the open position.

12. A cover, comprising:

a first panel having an opening therethrough;

a sliding member connected to said first panel and being slidable to an open position in which the opening is at least partially uncovered, and being slidable to a closed position in which the opening is fully closed, wherein said sliding member includes a leg arranged parallel to a surface of the first panel and having an opening therethrough;

a second panel attachable to said first panel and having a lock arrangement thereon, said lock arrangement being engageable with said sliding member when said sliding member is in the closed position to prevent the sliding member from being moved to the open position, said lock arrangement including a lock mechanism attached to said second panel, a cam plate connected to said lock mechanism, and at least one bar having a first end operatively connected to said cam plate and a second end, said cam plate moving said bar when said lock mechanism is operated, with the second end of said bar being insertable through the leg opening of said sliding member when said sliding member is in the closed position; and a mounting tab connected to said first panel and being arranged to be accessible through the opening in said first panel only when said sliding member is in the open position.

13. A cover, comprising:

a first panel having an opening therethrough;

a sliding member connected to said first panel and being slidable to an open position in which the opening is at least partially uncovered, and being slidable to a closed position in which the opening is fully closed;

a second panel attachable to said first panel and having a lock arrangement thereon, said lock arrangement being engageable with said sliding member when said sliding member is in the closed position to prevent the sliding member from being moved to the open position, said second panel having an opening, and a door arranged in the opening of said second panel, said lock arrangement being engageable with said door to prevent said door from being open, wherein said door includes a leg that extends parallel to a surface of said second panel, and is arranged to slide both away from and toward said lock arrangement, and wherein said lock arrangement includes a lock mechanism attached to said second panel, and a rotatable cylinder having a raised portion and being connected to and rotated by said lock mechanism, said leg including a recess along an edge thereof that is positioned adjacent to said cylinder when said door is slid into a predetermined position, whereby rotation of said cylinder when said door is in the predetermined position causes the raised portion to come into registration with the leg recess, thereby preventing further movement of said door; and a mounting tab connected to said first panel and being arranged to be accessible through the opening in said first panel only when said sliding member is in the opened position.

14. A cover, comprising:

a panel having an essentially flat, planar door member that is slidable to cover an opening, and locking means for preventing said door member from being opened, wherein said door member includes a leg that extends parallel to a surface of said panel, and arranged to slide both away from and toward said locking means, said locking means including a lock mechanism attached to said panel, and a rotatable cylinder having a raised portion and being connected to and rotated by said lock mechanism, said leg including a recess along an edge thereof that is positioned adjacent to said cylinder when said door member is slid into a predetermined position, whereby rotation of said cylinder when said door member is in the predetermined position causes the raised portion to come into registration with the leg recess, thereby preventing further movement of said door member.

15. A method of preventing access to a user-operated component of a computer, which comprises utilizing the cover of claim 14.

16. A cover, comprising:

a first panel;

a sliding member connected to said first panel, and including a rigid latch arm;

a second panel having a latch-receiving member attached to an inner surface thereof, an edge of said second panel being connectable to, and locatable adjacent to an edge of said first panel to form an angle, with said latch-receiving member projecting toward said sliding member, said sliding member being slidable along an inner surface of said first panel until said rigid latch arm engages with said latch-receiving member to releasably secure said first panel to said second panel; and a lock arrangement disposed on said second panel, said lock arrangement being engageable with said sliding member to prevent said sliding member from being moved and disengaging said rigid latch arm from said latch-receiving member.

17. A method of covering a frame without using any fasteners visible from view outside of the cover which comprises utilizing the cover of claim 16.

18. A cover, comprising:

a first panel;

a sliding member connected to said first panel, and including a rigid latch arm, and a leg arranged parallel to a surface of said first panel and having an opening therethrough;

a second panel having a latch-receiving member attached to an inner surface thereof, said second panel being locatable adjacent to said first panel to form an angle, with said latch-receiving member projecting toward said sliding member, and said sliding member being slidable along an inner surface of said first panel until said rigid latch arm engages with said latch-receiving member to releasably secure said first panel to said second panel; and a lock arrangement disposed on said second panel, said lock arrangement being engageable with said sliding member to prevent said sliding member from being moved and disengaging said rigid latch arm from said latch-receiving member, said lock arrangement including a lock mechanism attached to said second panel, a cam plate connected to said lock mechanism, and a bar having a first end operatively connected to said cam plate and having a second end, said cam plate moving said bar when said lock mechanism is operated, with the second end being insertable through the leg opening, thereby preventing said sliding member from being moved.

19. A covered assembly, comprising:

a frame for housing components;

at least one side panel having an opening therethrough, and being arranged over a respective side of said frame, said side panel having a retention piece projecting away from an inner surface of said panel;

a sliding member connected to said side panel and being slidable along the inner surface of said side panel to an open position in which the opening is at least partially uncovered, and being slidable to a closed position in which the opening is closed, said sliding member comprising:
  a flexible catch member arranged to slide along the inner surface of said side panel, and being engageable with said retention piece when said sliding member is in the open position to retain the sliding member in the open position; and
  a rigid latch arm arranged parallel to said side panel;

a front panel having an opening, a door within the opening, and a projecting member and a latch-receiving member attached to an inner surface of said front panel, said front panel being locatable over a front of said frame and adjacent to said side panel to form an angle, with said projecting member projecting toward said sliding member, whereby said projecting member presses against said catch member when said sliding member is in the open position causing said catch member to disengage with said retention piece so that said sliding member can move toward the closed position, thereby causing said latch-receiving member and said rigid latch arm to engage together to secure said side panel to said front panel;

a lock arrangement located on said front panel, and being engageable with said sliding member when said sliding member is in the closed position to prevent the sliding member from being moved to the open position, said lock arrangement further being engageable with said door to prevent said door from being opened;

a spring connected to said side panel and contacting said sliding member, said spring automatically moving said sliding member into the closed position when said projecting member presses against said catch member, so that said latch-receiving member automatically engages with said rigid latch arm;

a mounting tab connected to said side panel and being arranged to be accessible through the opening when said sliding member is in the open position;

a top panel positioned over a top of said same, and being engageable with said side panel;

a rear panel positioned over a rear of said frame; and a fastener insertable through said mounting tab and fastening said side panel to said frame.

20. A cover comprising:

a panel having a sliding door; and locking means for preventing said door from being opened,
  wherein said panel has a surface located in a first plane, and wherein said sliding door is positioned superposed to the surface of said panel and slides along a second plane that is essentially parallel to the first plane, and wherein said door includes a leg that extends along the second plane and superposed to the surface of said panel, and is arranged to slide both away from and toward said locking means, said locking means including a lock mechanism attached to said panel, and a rotatable cylinder having a raised portion and being connected to and rotated by said lock mechanism, said leg including a recess along an edge thereof that is positioned adjacent to said cylinder when said door is slid into a predetermined position, whereby rotation of said cylinder when said door is in the predetermined position causes the raised portion to come into registration with the leg recess, thereby preventing further movement of said door.

* * * * *